United States Patent [19]
Taniguchi et al.

[11] 3,975,759
[45] Aug. 17, 1976

[54] COLOR KILLER CIRCUIT SYSTEM VIDEO TAPE RECORDER

[75] Inventors: Hiroshi Taniguchi, Hirakata; Ichiro Arimura, Kyoto, both of Japan

[73] Assignee: Matsushita Electric Industrial Co., Ltd., Osaka, Japan

[22] Filed: Oct. 11, 1974

[21] Appl. No.: 514,182

[52] U.S. Cl. .................................................. 358/4
[51] Int. Cl.² .......................................... H04N 5/79
[58] Field of Search ............................. 358/4, 26, 8

[56] References Cited
UNITED STATES PATENTS
2,908,750  10/1959  Heuer et al. ........................... 358/26

*Primary Examiner*—Robert L. Griffin
*Assistant Examiner*—John C. Martin
*Attorney, Agent, or Firm*—Stevens, Davis, Miller & Mosher

[57] ABSTRACT

A steady and inexpensive color killer circuit system for a simplified video tape recorder of the type wherein the luminance signal and chrominance signal of a color television signal are respectively converted into an angular modulation signal and a lower frequency conversion signal for recording these signals in the form of a combined signal and also where a reproduced lower frequency converted chrominance signal is heterodyned with a continuous signal phase locked to the color burst signal in the reproduced chrominance signal to thereby cancel jitter components in the reproduced chrominance signal. The color killer circuit system comprises a single killer detector provided in the reproducing circuit, said killer detector including a switch for coupling the lower frequency converted chrominance signal on the recording side to the reproducing side circuit, a phase shifter for 90-degree phase shifting either one of two inputs, namely the afore-said color burst signal and a continuous signal, to a phase comparator to produce said continuous signal phase locked to the color burst signal, and a synchronous detector for synchronously detecting the color burst signal with the afore-said continuous signal phase locked thereto. The detection output of the killer detector is used to control the color killer circuits.

5 Claims, 9 Drawing Figures

COLOR KILLER CIRCUIT SYSTEM VIDEO TAPE RECORDER

This invention relates to color killer circuit systems for video signal recording and reproducing systems.

Heretofore, there have been proposed and employed various automatic cirucit switching systems for switching the circuits of simplified video tape recorders (hereinafter referred to as VTR) for recording and reproducing video signals between a color signal processing mode and a monochrome signal processing mode. However, stability of performance, simplicity of construction and low cost are simultaneously met by none of these systems. Color television receivers already employ various steady and inexpensive systems as a color killer circuit for automatically switching the circuit between the color television signal reception mode and the monochrome television signal reception mode by detecting the color or monochrome signal. In the recording and reproduction of video signals with a simplified VTR, however, automatic discrimination between the color television signal and the monochrome television signal has encountered various difficulties because of the fact that two color killer detectors are required, one on the recording side and the other on the playback side, that jitter components are introduced into the reproduced color television signal and that the reproduced signal contains noise peculiar to the VTR.

A primary object of the invention is to provide, in connection with a simplified VTR, for instance, of the type where the luminance signal and chrominance signal are respectively recorded in the form of an FM modulation output and in the form of a lower frequency conversion output, these outputs being combined for recording, a color killer circuit system for automatically switching the circuit between the monochrome television signal recording and reproducing mode and the color television signal recording and reproducing mode by detecting the input signal, and which is simple in construction and steady in performance.

Another object of the invention is to provide a simple color killer circuit system, in which the switching on the recording side and that on the playback side are effected with a single detection signal.

A further object of the invention is to provide a killer signal detector circuit for the VTR, which is simple, steady and reliable.

The above and other objects, features and advantages of the invention will become more apparent from the following description taken in conjunction with the accompanying drawings, in which.

Before describing the invention in detail, a summary of the color television signal recording and reproducing system for the standard I-type VTR, which is a well-known simplified VTR recommended as a standard by the Electronic Industries Association in Japan (hereinafter referred to as E.I.A.J.), will first be given.

Figure 1:
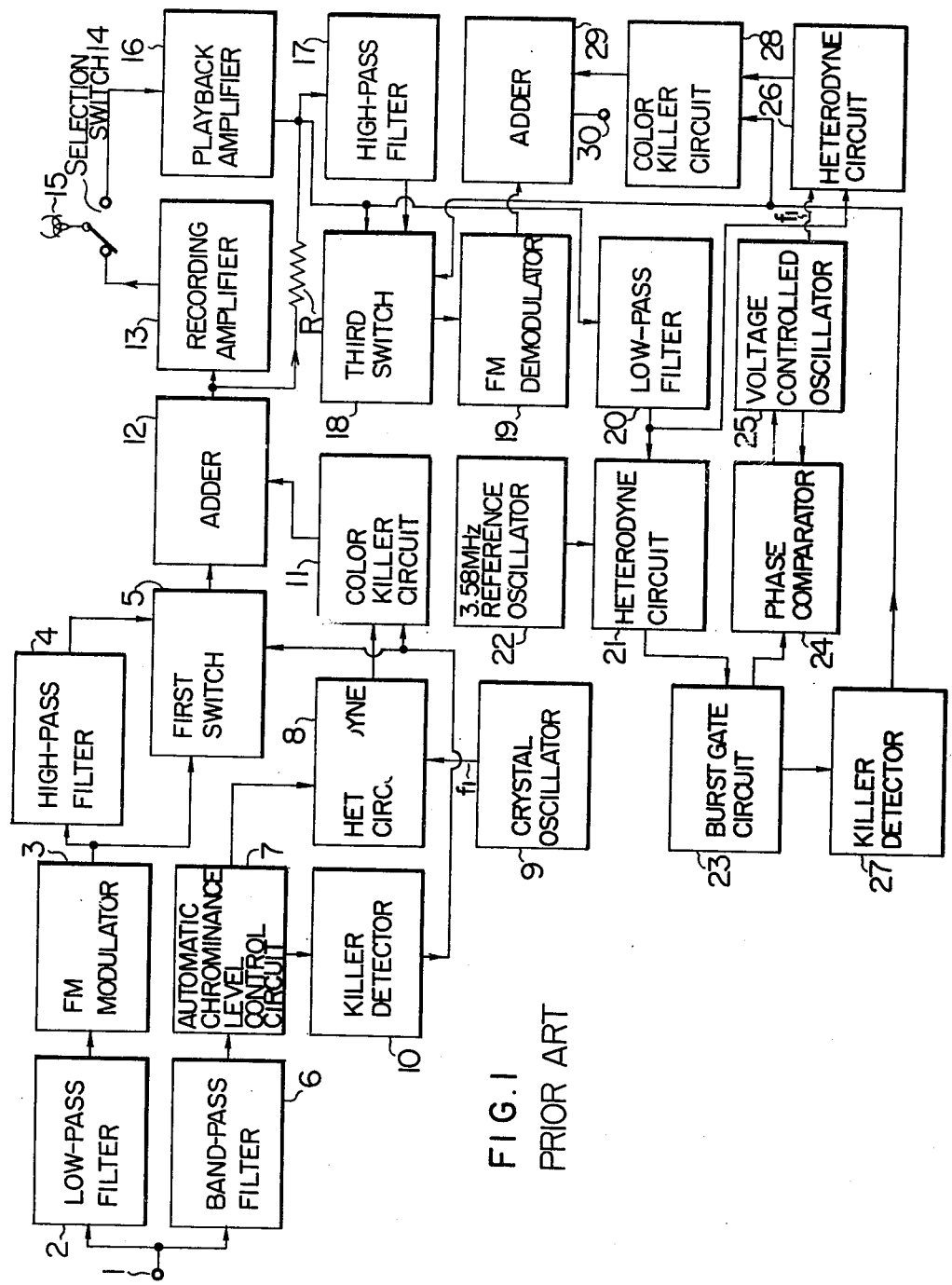
FIG. 1 is a block diagram showing a prior-art color killer circuit system for a chrominance signal lower frequency conversion type VTR.

FIG. 1 outlines a specific circuit construction of the color television signal recording and reproducing system (based on frequency conversion of the chrominance signal to a lower frequency for recording) for the afore-said standard I-type VTR. Referring to FIG. 1, an NTSC color television signal added to an input terminal 1 is coupled to both a low-pass filter 2 and a band-pass filter 6. The low-pass filter 2 separates the luminance signal (i.e., Y-signal) for conversion into am FM modulated signal in an FM modulator 3. A high-pass filter 4 blocks part of the lower sideband of the FM modulated signal, and the resultant wave is coupled through a first switch 5 to an adder 12. Meanwhile, the band-pass filter 6 selectively passes the 3.58-MHz modulated chrominance signal to an automatic chrominance level control circuit 7 for automatically controlling the color burst level to a constant level. The output of the circuit 7 is coupled to a heterodyne circuit 8 for heterodyning with a signal from a steady crystal oscillator 9 oscillating at 4.3 MHz to obtain a difference frequency modulated chrominance signal at 767 kHz, which is coupled through a color killer circuit 11 to the afore mentioned adder 12. A detector 10 produces a killer signal by detecting the level of the burst signal in the output of the circuit 7. The output signal of the killer detector 10 is coupled to the color killer circuit 11 to operate the same, while it is also coupled to the first switch 5 so as to short-circuit the high-pass filter 4 if a monochrome television signal appears. The output of the adder 12 is amplified through a recording amplifier 13 before being led through a recording/playback select switch 14 to a video head 15 for recording on a magnetic tape. Also, the output of the adder 12 is usually connected through a resistor R to the playback side circuit for monitoring the signal led through the VTR circuit at the time of recording. In playback, the reproduced R-F signal is amplified through a playback amplifier 16, whose output is coupled to both high-pass filter 17 and low-pass filter 20. The high-pass filter 17 selectively passes the FM signal through a third switch 18 to an FM demodulator 19 for FM demodulation to recover the luminance signal. Meanwhile, the low-pass filter 20 separates the 767-kHz modulated chrominance signal, which is coupled to a heterodyne circuit 21 for heterodyning with a signal from a steady 3.58-MHz crystal oscillator 22 to obtain the sum combination, i.e., 4.3-MHz modulated chrominance signal. A burst gate circuit 23 extracts the color burst signal from the 4.3-MHz modulated chrominance signal. The extracted color burst signal is phase compared in a phase comparator 24 with a signal from a voltage controlled oscillator 25, and the phase comparison error signal produced thereby is used to control the voltage controlled oscillator 25 to produce a continuous signal phase locked to the color burst signal. This continuous signal is coupled to a heterodyne circuit 26 for heterodyning with the chrominance signal output of the low-pass filter 20, and the resultant steady modulated chrominance signal at the difference frequency of 3.58 NHz is led to a color killer circuit 28. Meanwhile, a killer detector 27 detects the level of the color burst signal output of the burst gate circuit 23 and produces a signal for discriminating between color and monochrome. This discrimination signal is coupled to both color killer circuit 28 and the third switch 18. The third switch 18 acts such that it passes the signal from the high-pass filter 17 when reproducing a color signal and that the high-pass filter 17 is short-circuited when a monochrome signal is handled. The reproduced luminance signal and chrominance signal are combined in an adder 29 to obtain at an output terminal 30 a reproduced NTSC signal free from any chrominance signal jitter component.

The above prior-art system of FIG. 1 has a drawback in that it has two killer detectors (10 and 27). Provision of am additional killer detector means an increase in the number of unstable elements as well as increased cost. Generally, a system where only the color burst level is detected for the detection of the color killer signal is prone to malfunction. Particularly, in the case of a VTR where the luminance signal is recorded in the form of an FM modulated signal, leakage of the FM carrier into the demodulated signal often results (due to distortions in the circuit, particularly deviations from balance in the limiter and FM demodulator). In the case of the EIAJ standard I-type VTR, the FM carrier frequency, which is particularly liable to leak at the level of the back porch (where the color burst is inserted) of the horizontal sync pulse, is in the neighborhood of 3.6 MHz. If the leaked FM carrier is erroneously detected as the 3.58-MHz color burst, malfunction of the color killer circuit would result. Such leakage of the FM carrier into the demodulated luminance signal constitutes a significant problem in such a case that a signal recorded and reproduced with one simplified VTR is recorded and reproduced with a different simplified VTR.

When a color killer circuit in a color television receiver loses its normal function, color noise appears on the monochrome picture reproduction on the screen. In this case, the color noise can be removed by manipulating the knob for the color level. In the case of a VTR, however, once a monochrome signal is taken as the color signal (as a result of the malfunction of the color killer circuit due to the above or other causes) and is recorded in the color signal recording mode on the magnetic tape; even if the color killer circuit of a monitor TV set identifies the reproduced signal as monochrome, the picture is reproduced very untidily on the screen since it is much disturbed with a great deal of ringing and beat interferences or high frequency components extremely emphasized (because of the luminance components of about 3.58 MHz being largely amplified by the color AGC circuit of the VTR). Conversely, once a color signal is erroneously recorded as a monochrome signal on the magnetic tape, normal reproduction in color would never be obtained.

For the above reasons, the color killer circuit for a VTR is required to have as steady a performance as or a steadier performance than that of the color television receiver. However, since there are various problems in the color killer circuit for the VTR as mentioned earlier, almost all presently available models use both automatic and manual color killer circuits.

At any rate, the conventional models of VTR require two color killer detectors, one on the recording side and the other on the playback side; that is, two unstable elements and that much extra cost, as mentioned earlier. In the circuit of FIG. 1 where two color killer circuits are provided, each on each of the recording and playback sides, two killer detectors are needed and cannot be replaced with a common one.

In accordance with the invention, a system using only a single killer detector is provided for solving the the afore-mentioned various problems in the VTR color killer circuit and ensuring steady performance.

More particularly, the color killer circuit system according to the invention uses a single killer detector, which is provided on the playback side circuit and whose detection signal is also used to control the recording side color killer circuit.

Figure 2:
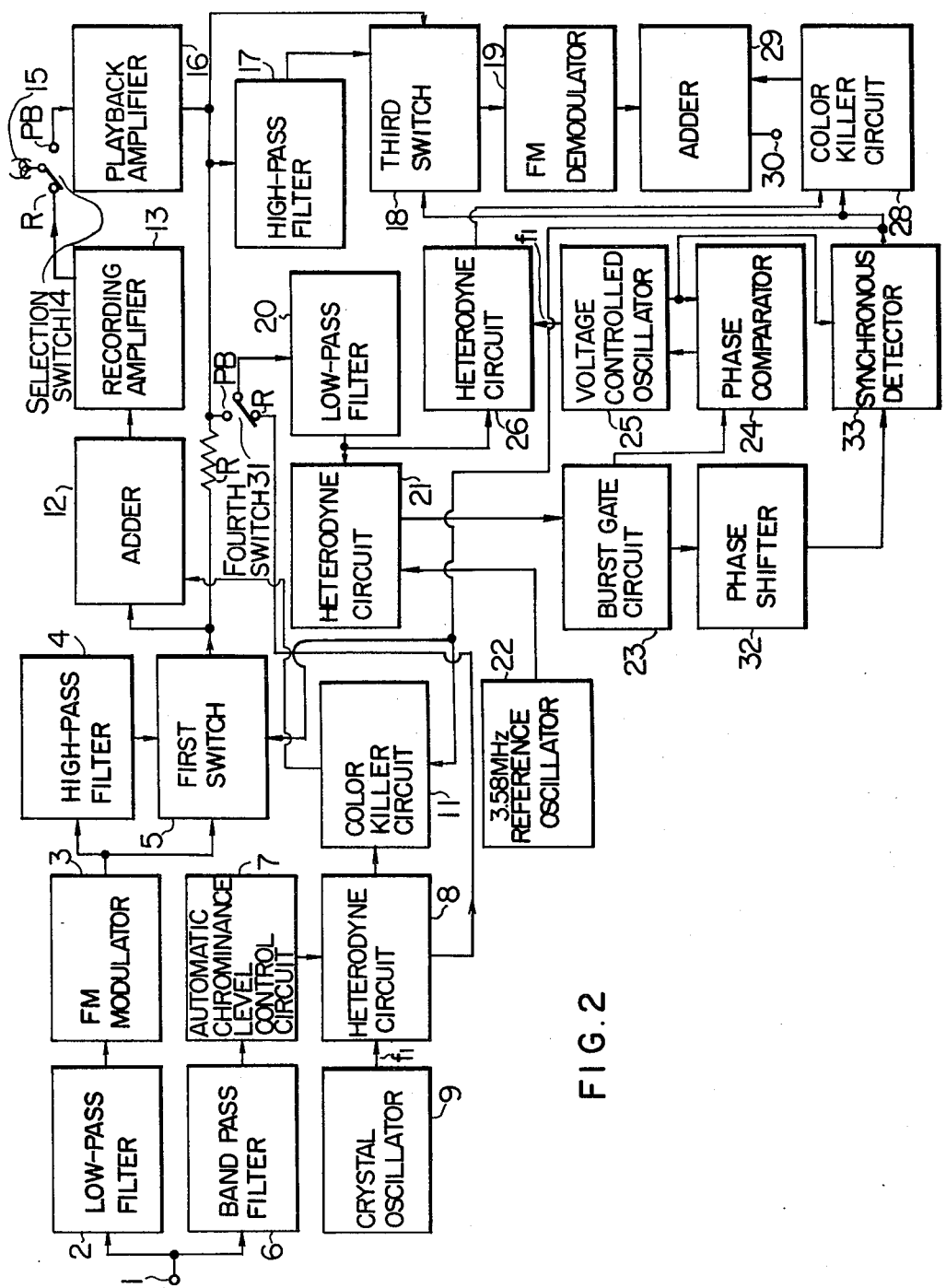
FIG. 2 is a block diagram showing a circuit construction for illustrating a color killer circuit system embodying the invention.

FIG. 2 shows a block diagram showing an embodiment of the invention. In FIG. 2, like reference numerals designate like elements in FIG. 1. In this system, the lower frequency converted modulated chrominance signal on the recording side (i.e., the output of heterodyne circuit 8), which is coupled through the color killer circuit 11, is also adapted to be led through a fourth switch 31 to low-pass filter 20 on the playback side. The fourth switch 31 is switched between a recording position and a playback position like the second switch 14. In the instant embodiment, the circuit for discriminating between the color signal and the monochrome signal is constituted by a phase shifter 32 and a synchronous detector 33. The phase shifter 32 shifts the phase of the burst signal output of burst gate 23 by 90 degrees, and the synchronous detector 33 synchronously detects the phase shifted burst signal with the output of voltage controlled oscillator 25. The output of the synchronous detector 33 is led to switch 5 and color killer circuit 11 on the recording side and also to switch 18 and color killer circuit 28 on the playback side for switching between the color signal mode and the monochrome signal mode. on the recording side, the modulated chrominance signal which is to be recorded on the magnetic tape passes through the color killer circuit, while that which does not pass through the color killer circuit is led to the playback side chrominance signal processing circuit.

Figure 3:
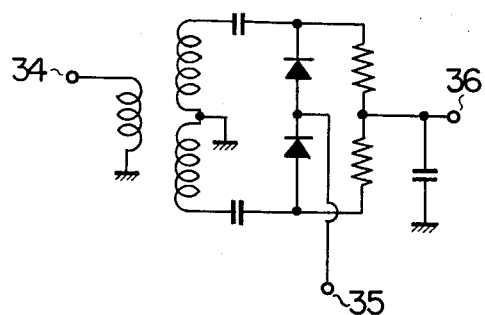
FIG. 3 is a circuit diagram showing an example of the synchronous detector.

The synchronous detector 33 may be similar to the chrominance signal detector circuit used in a color television receiver. FIG. 3 shows an example of the synchronous detector 33. In FIG. 3 the phase-shifted burst signal is added to an input terminal 34, while a continuous signal for detection (for instance the output of the voltage controlled oscillator 25 in FIG. 2) is added to the other input terminal 35. The burst signal synchronous detection output is obtained from an output terminal 36.

Referring back to FIG. 2, if the free oscillation frequency of the voltage controlled oscillator 25 is equal to the input burst frequency, the oscillation phase of the voltage controlled oscillator 25 differs by just 90° from the phase of the input burst signal, and at this time the error voltage output of the phase comparator is zero. In general, when the free oscillation frequency of the voltage controlled oscillator 25 and the input burst signal frequency differs by $\Delta f$ from each other, the oscillation phase of the variable controlled oscillator and the input burst signal phase are related as $$\Delta f = k\cos(\theta - 90°) = k\sin\theta \qquad (1)$$

where $\theta$ is the angular deviation of the phase of the voltage controlled oscillator output and burst signal from 90°, and $k$ is the DC loop gain of the APC loop.

Thus, by coupling the output of the phase shifter 32 to the synchronous detector 33 and phase shifting the burst signal gated by the burst gate circuit 23 by 90° to be led to the synchronous detector 33, the peak level of the phase shifted burst signal is synchronously detected with the continuous wave output of the voltage controlled oscillator 25.

Figure 4:
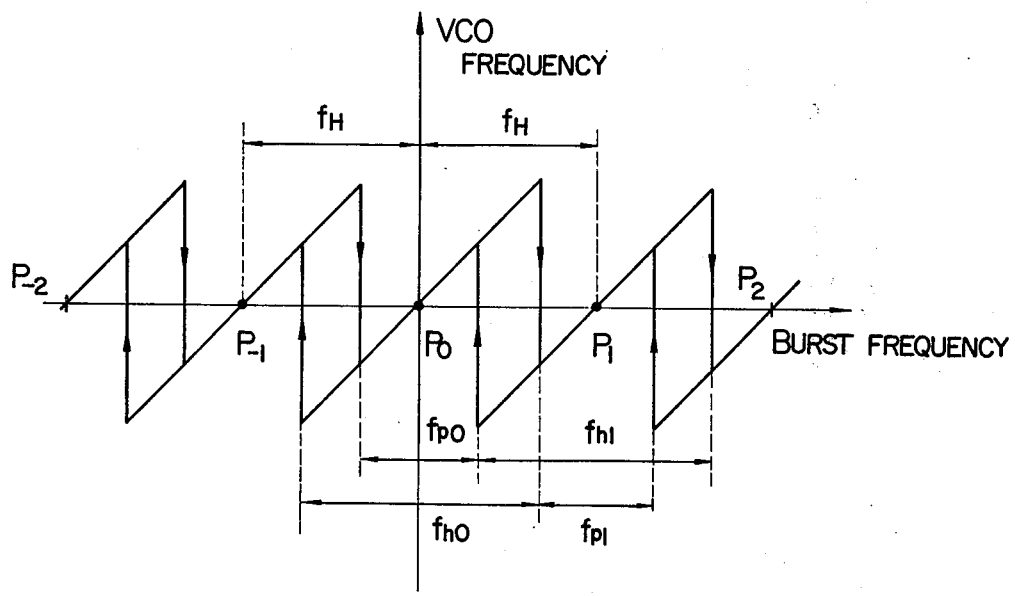
FIG. 4 is a graph showing the synchronizing characteristics of an APC circuit.
Figure 5:
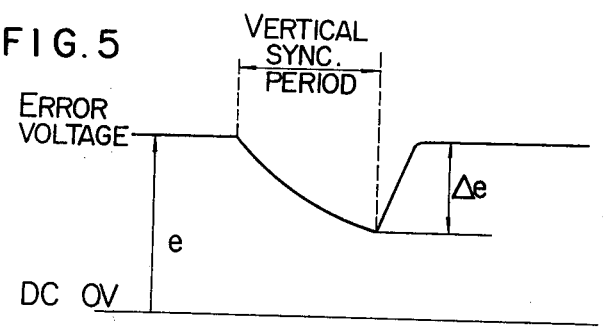
FIG. 5 is a graph showing a working characteristic of the APC circuit.

A problem encountered with the synchronous detector for the VTR is that the color burst signal is subject to frequency variations since the reproduced chrominance signal contains a jitter component. If a frequency difference of $\Delta f$ between the color burst frequency and free oscillation frequency of the voltage controlled oscillator results from a frequency variation, a phase error of $\theta$ in the above equation 1 results in the APC circuit. Theoretically, therefore, the maximum frequency deviation within the hold range of the APC circuit must occur when $\theta = \pi/2$ and must be $k$. The APC circuit for the VTR, unlike one constituted by a voltage controlled oscillator, has to be constructed with an LC oscillator (because the frequency variation of the reproduced burst signal is as great as about 1 percent at the maximum and a correspondingly wide variable frequency range is required for the synchronous detection). Although a wide variable frequency range and a large loop gain may be provided (with $\theta$ being reduced by increasing the loop gain), for steady operation of the APC circuit the loop gain $k$ has to be set to a moderate value and cannot be unreasonably increased. One reason for this is the problem of side lock in the APC circuit. Since the burst signal is transmitted on the back porch of each horizontal sync pulse, the APC circuit can be considered a sampled value control system. In fact, it has a characteristic hysteresis as shown in FIG. 4 for the synchronization. As is shown, there are a number of pull-in ranges $f_p$ and corresponding hold ranges $f_h$, with their respective center frequencies spaced apart at an interval of the horizontal sync frequency $f_H$; pull-in range $f_{p0}$ and hold range $f_{h0}$ exist with respect to the regular synchronization point $P_0$, pull-in range $f_{p1}$ and hold range $f_{h1}$ exist with respect to the next synchronization point $P_1$, and so forth. Since $f_{p0} \cong f_{p1}$ and $f_{h0} \cong f_{h1}$, with the frequency difference between $P_0$ and $P_1$ being $f_H$, there holds a relation $$f_p + f_h \cong 2f_H \tag{2}$$

It will be seen from the above equations 1 and 2 that the phase error may be reduced by increasing the loop gain $k$. However, by increasing $k$ and hence $f$ (i.e., $f_h$) the pull-in range $f_p$ of the APC circuit is reduced.

Accordingly, for a steady and reliable synchronization characteristic the value of $k$ in the APC circuit for the VTR is selected such that $f_p \triangleq 11$ kHz and $f_h \cong 20$ kHz.

As mentioned earlier, at a limit of the hold range (where $f_h$ is maximum) $\theta$ must be $\pi/2$. However, if $\theta$ reaches $\pi/2$, the detection phase in the synchronous detector is deviated by 90°, so that the burst signal synchronous detection output is zero. In this case, the normal function of the color killer circuit is lost.

This, however, does not actually result since the maximum phase error in the APC circuit of actual VTR circuits is far smaller than $\pi/2$. The reason why it is so is as follows. In the color television signal no burst signal is present during the vertical sync signal period (that is, period of the equivalent pulse corresponding to 9 horizontal lines), so that the pull-in is repeated for each field. Because of the absence of the burst signal during the vertical sync period, the phase error voltage $e$ of the phase comparator is reduced by $\Delta e$ in this period from the value immediately before this period according to the time constant of the hold circuit with a resultant change of the voltage controlled oscillation frequency, and the pull-in function is resumed with the burst signal immediately after the vertical sync period.

From the above grounds, the maximum phase error in the synchronized state of the APC circuit of actual VTR circuits does not exceed 30°, so that no less than 86 percent (i.e., cos 30°) of the burst level is made available for the detection in the synchronous detector, thus permitting steady and reliable synchronous detection.

Further, by adopting the synchronous detection system as mentioned above it is possible to obtain a performance comparable with that of the color killer circuit in a color television receiver and provide a steady and reliable system free from malfunction even with respect to the leak of the FM carrier. While in the system of FIG. 2 the phase shifter 32 is provided between the burst gate circuit 23 and synchronous detector 33, the same effects may apparently be obtained by inserting it between the voltage controlled oscillator 25 and synchronous detector 33.

Figure 6A:
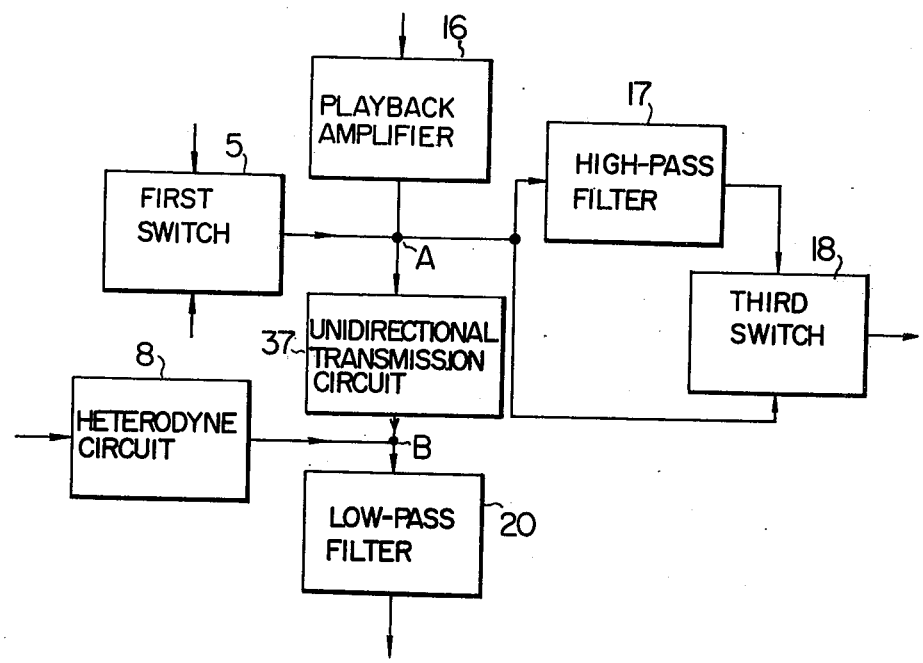
FIGS. 6a and 6b show part of a modification of the embodiment of FIG. 2.

Also, it is possible to adopt a circuit as shown in FIG. 6a in place of the fourth switch 31 for switching between the recording and playback modes.

In FIG. 6a, parts 5, 8, 16, 17, 18 and 20 have the same function as those of like reference numerals in FIG. 2. Numeral 37 designates a unidirectional circuit, which can pass a signal from point A to point B but does not practically transmit a signal in the reverse direction. It may, for instance, be an emitter follower as shown in FIG. 6b.

Figure 6B:
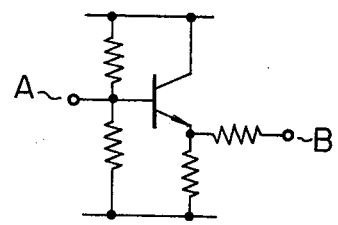
Figure 7:
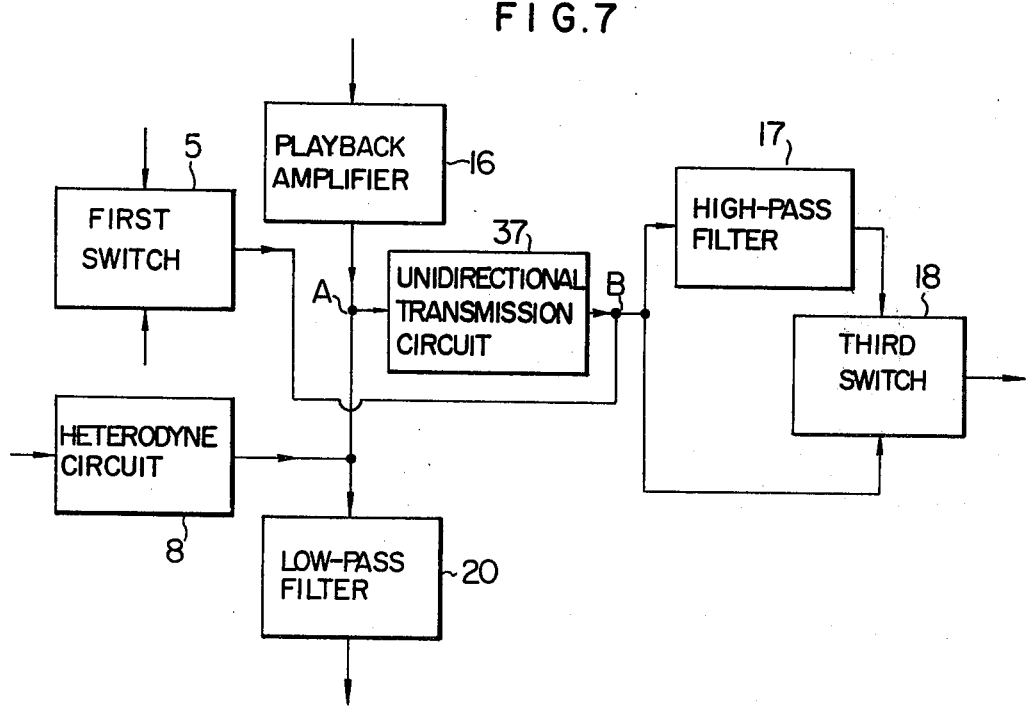
FIG. 7 is a block diagram showing part of another modification of the embodiment of FIG. 2.

Also, it will be apparent that the unidirectional transmission circuit 37 of FIG. 6b may be inserted between playback amplifier 16 and high-pass filter 17 as shown in FIG. 7.

Figure 8:
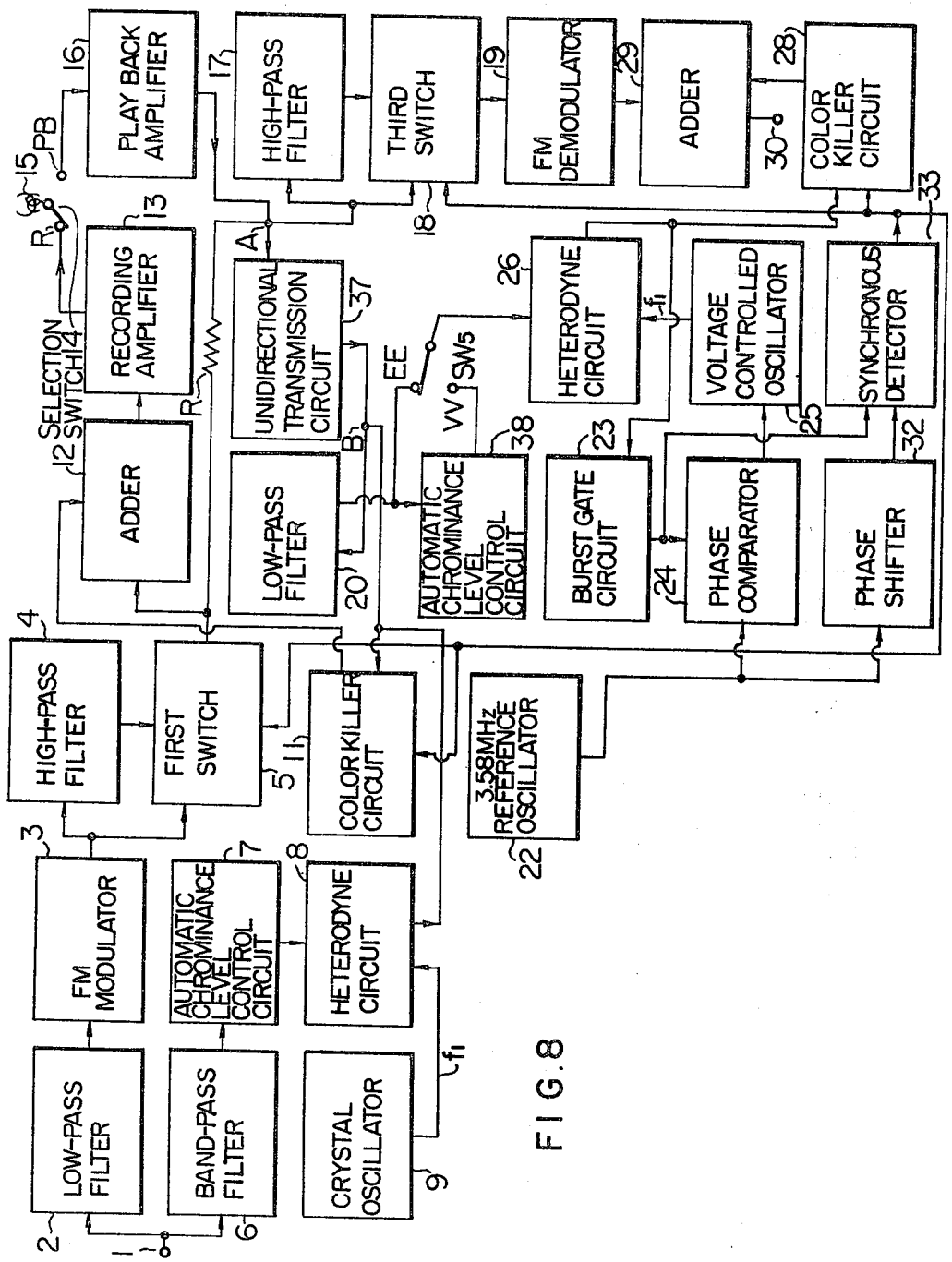
FIG. 8 is a block diagram showing another embodiment of the color killer circuit system according to the invention.

FIG. 8 shows another embodiment of the invention. In the Figure, parts having the same function as those in FIG. 2 are designated by like referene numerals. In this embodiment, the standard frequency modulated chrominance signal output of heterodyne circuit 26 is coupled to burst gate circuit 23 to extract the burst signal, which is phase compared with the signal from 3.58-MHz reference oscillator 22, and the resultant phase error signal is used to control the oscillation phase of the voltage controlled oscillator 25. Meanwhile, the signal from the reference oscillator 22 is coupled to phase shifter 32 to produce a 90° phase shifted output for synchronous detection of the peak level of the burst signal output of the burst gate circuit 23, the detection output being supplied as a color killer signal to switch 5 and color killer circuit 11 on the recording side and also to switch 18 and color killer circuit 28 on the playback side.

In addition, uni-directional transmission circuit 37 is provided between playback amplifier 16 and low-pass filter 20.

Further, the output signal of the low-pass filter 20 is coupled to an automatic chrominance level control circuit 38 to control the reproduced chrominance signal level to a constant level. With this construction, in recording the burst signal to be led to the killer detector circuit passes through two automatic chrominance level control circuits 7 and 38. Thus, since it is usual to set the gain of each level control circuit in the presence of a monochrome signal to about 20 db, an amplification degree of about 40 db is provided by the two level control circuits. In this case, the ringing portion of the rising portion of the horizontal sync signal is likely to be beyond the ignorable level and be erroneously detected as a color burst signal in the killer detector circuit. To avoid this, a method of switching a fifth switch such that in recording the output of the low-pass filter 20 coupled, without passing through the automatic chrominance level control circuit 38, to the heterodyne circuit 26 is effective.

While the above description has been concerned with the construction of the color killer circuit system over the whole recording and reproducing system, it will be apparent that the circuit in the reproducing system may be directly employed only for the reproducing system.

Also, various changes and modifications of the above two embodiments are possible without departing from the scope and spirit of the invention.

It is to be emphasized that by adopting the construction, it is possible to construct a color killer circuit system for the VTR, which is highly steady and stable and simple in construction.

What we claim is:

1. In a video signal recording and reproducing system having
    a. a recording channel including
        1. means for receiving a luminance signal forming part of a color television signal,
        2. means for angular-modulating said luminance signal,
        3. means for receiving a modulated chrominance signal including a color burst signal,
        4. means for frequency-converting said modulated chrominance signal to a low-frequency modulated chrominance signal,
        5. means for combining said angular-modulated luminance signal with said low-frequency modulated chrominance signal, and
        6. means for recording said combined signal on a record medium, and
    b. a reproducing channel including
        1. a variable frequency oscillator for generating a continuous signal,
        2. means for heterodyning said low-frequency modulated chrominance signal with the continuous signal from said variable frequency oscillator,
        3. means for controlling the frequency of said variable frequency oscillator in accordance with the phase variations due to time-axis variations of said color burst signal thereby obtaining at the output of said means for heterodyning said low-frequency modulated chrominance and continuous signals a modulated chrominance output signal free from time-axis variations,
        4. means for angular-demodulating a luminance signal obtained from said record medium, and
        5. means for combining said modulated chrominance output signal free from time-axis variations with said angular-demodulated luminance signal to reproduce said color television signal, a circuit for automatically switching between monochrome and color television signal recording and reproducing modes, comprising:
    a first color killer circuit coupled in said recording channel to said means for frequency-converting said modulated chrominance signal to a low-frequency modulated chrominance signal,
    a second color killer circuit in said reproducing channel,
    means for coupling to said reproducing channel a part of said low-frequency modulated chrominance signal that does not pass through said first color killer circuit for control of said variable frequency oscillator,
    means for phase-shifting either said color burst signal or the continuous signal from said variable frequency oscillator, and
    synchronous detection means for receiving said color burst signal and said continuous signal, one of said burst signal and said continuous signal being phase-shifted by said means for phase shifting, for synchronously detecting the peak level of said color burst signal to produce a mmonochromecolor discrimination signal, said discrimination signal being coupled to said first and second color killer circuits for the control thereof.

2. A circuit for automatically switching between monochrome and color television signal recording and reproducing modes as defined by claim 1, wherein said color burst signal is extracted from said chrominance signal by means comprising
    a low-pass filter in said reproducing channel to provide a low-frequency modulated chrominance signal,
    a reference oscillator,
    means for heterodyning the low-frequency modulated chrominance signal at the output of said low-pass filter with the output of said reference oscillator, and
    a burst gate circuit coupled to the output of said means for heterodyning the outputs of said low-pass filter and reference oscillator,
    and wherein said means for controlling the frequency of said variable frequency oscillator comprises a phase comparator having its inputs coupled to the outputs of said burst gate circuit and said variable frequency oscillator, said phase comparator generating an error signal for controlling said variable frequency oscillator to produce said continuous signal phase-locked to said color burst signal.

3. A circuit for automatically switching between monochrome and color television signal recording and reproducing modes as defined by claim 1, wherein said color burst signal is extracted from said chrominance signal by means comprising
    means for heterodyning said low-frequency modulated chrominance signal with the continuous signal at the output of said variable frequency oscillator, and
    a burst gate circuit coupled to the output of said means for heterodyning said chrominance and continuous signals,
    and wherein said means for controlling the frequency of said variable frequency oscillator comprises a reference oscillator and a phase comparator having its inputs coupled to the outputs of said burst gate circuit and said reference oscillator, said phase comparator generating an error signal for controlling said variable frequency oscillator.

4. A circuit for automatically switching between monochrome and color television signal recording and reproducing modes as defined by claim 1, which further comprises
an automatic gain control circuit in said reproducing channel for controlling the gain of the low-frequency modulated chrominance signal coupled to the means for heterodyning said chrominance signal with the continuous signal from said variable frequency oscillator in the reproducing mode, and switching means for bypassing said automatic gain control circuit in the recording mode.

5. A circuit for automatically switching between monochrome and color television signal recording and reproducing modes as defined by claim 1, which further comprises a unidirectional transmission circuit for coupling the low-frequency modulated chrominance signal reproduced from said record medium to said recording and reproducing channels.

* * * * *